W. JONES.

Vehicle-Axle Lubricators.

No. 6,129. Reissued Nov. 10, 1874.

Witnesses

Chas. H. Smith

Geo. A. Pinckney

Inventor

Willis Jones.

per Lemuel W. Serrell atty.

THE GRAPHIC CO. PHOTO-LITH. 39 & 41 PARK PLACE, N.Y.

UNITED STATES PATENT OFFICE.

WILLIS JONES, OF BROOKLYN, E. D., NEW YORK.

IMPROVEMENT IN VEHICLE-AXLE LUBRICATORS.

Specification forming part of Letters Patent No. 148,368, dated March 10, 1874; reissue No. 6,129, dated November 10, 1874; application filed October 20, 1874.

*To all whom it may concern:*

Be it known that I, WILLIS JONES, of Brooklyn, E. D., in the county of Kings and State of New York, have invented an Improvement in Axles for Vehicles, of which the following is a specification:

Heretofore axles have been made with a groove, either longitudinally or spirally, the object being to contain lubricating material, or convey it from a supply-chamber to the bearing-surfaces. Grooves of this kind weaken the axle, and the lubricating material wastes away and runs out, and the axle is liable to heat.

My invention is made with special reference to lubricating the axles of large, heavy wheels, but may be used on all characters of vehicle-axles; and consists in a range or series of cavities or recesses upon the upper portion of the axle, disposed in such positions that the lubricating material introduced in such cavities will reach all parts of the inside of the box, but will not waste out of the cavities; hence the axle cannot get heated unless all the lubricant is exhausted, and in placing the grease upon the axle these cavities retain the same, and prevent its being scraped off by the box as it is introduced upon the axle.

Figure 1:
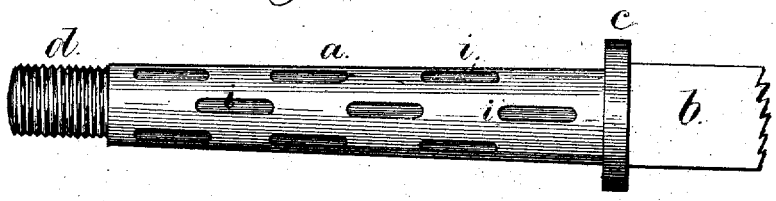
Figure 4:
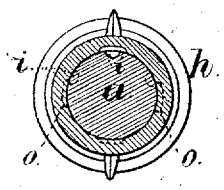
Figure 2:
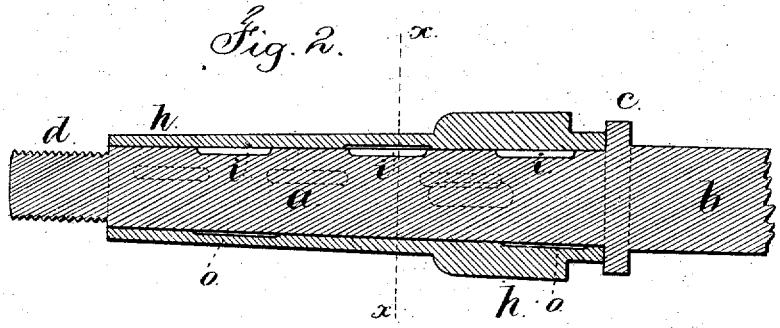
Figure 3:
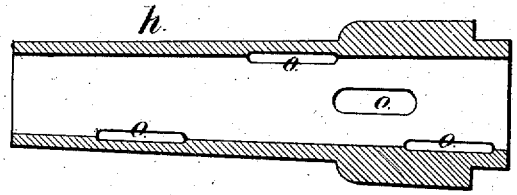

In the drawing, Figure 1 is a plan, showing the upper side of the axle. Fig. 2 is a vertical longitudinal section of the axle and box. Fig. 3 is a separate longitudinal section of the axle-box, and Fig. 4 is a cross-section at the line *x x*.

The axle *a* is at the end of the axle-bar *b*, and the collar *c* is provided, as usual, and also the screw end *d*. The cavities *i i* are not continuous, but are of any desired shape, and extended along the upper part of the surface of the axle *a*, at short distances from each other, so as to distribute the lubricating material over the entire interior of the pipe or axle box.

The best results are attained by placing the cavities in rows, alternately.

Longitudinal or transverse grooves in the axle weaken it, and cause it to wear or cut under pressure; but the upper part of the axle, being subject only to a compressing strain, will not be weakened for the duty required of it by cavities arranged as described, and of sufficient size to contain lubricating material, arranged as described; hence my improvement is of great value for heavy vehicles, where the lubricant is liable to be expelled by the pressure, or to run away, and the axle become heated and injured in a very short time.

I prefer to use the said axle with the axle-box *h*, (shown in Figs. 3 and 4,) the same having cavities *o* in the interior of about the size and arranged as shown.

I am aware that the interior of an axle pipe or box has been made with grooves running longitudinally to receive lubricating material. This pipe, as it revolves, empties the lubricating material from the cavities, causing the same to work out rapidly from the box.

In my improvement the cavities, being in the upper part of the stationary axle, retain the oil; but it is drawn out as required.

In cases where the axle is grooved longitudinally and circumferentially, the oil is not retained; neither is it retained when the grooves are spiral around the axle.

I claim as my invention—

The axle for a wheel-hub, made with recesses in the upper part of such axle, substantially in the manner and for the purposes set forth.

Signed by me this 8th day of October, 1874.

WILLIS JONES.

Witnesses:

GEO. T. PINCKNEY,
CHAS. H. SMITH.